May 11, 1965
D. SIGEL
3,183,445
PHASE COMPARATOR "AND" GATE
Filed April 4, 1962
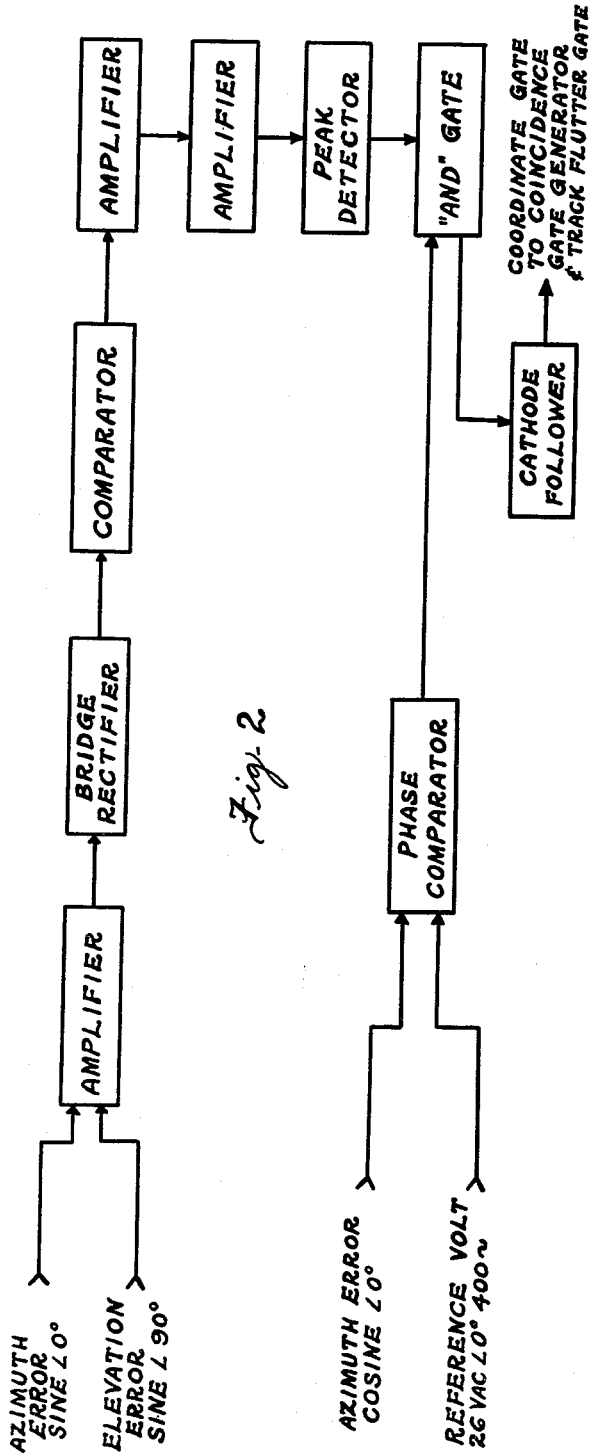
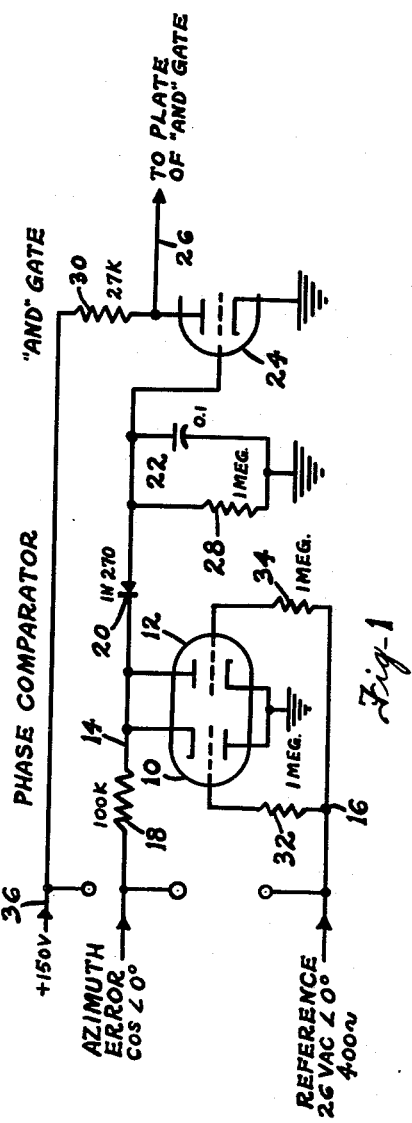
INVENTOR.
DAVID SIGEL
BY
Lawrence S. Epstein
ATTORNEY

United States Patent Office 3,183,445
Patented May 11, 1965

3,183,445
PHASE COMPARATOR "AND" GATE
David Sigel, Verona, N.J., assignor, by mesne assignments, to the United States of America as represented by the Secretary of the Navy
Filed Apr. 4, 1962, Ser. No. 185,168
2 Claims. (Cl. 328—134)

This invention relates to simulator devices and is particularly directed towards a comparator circuit which compares the phase between two alternating signals and provides an output signal which is proportional to the difference between the phase of the two input signals. In the practice of the present invention it is proposed to take a 26 volt 400 cycle reference voltage and compare it to an azimuth error voltage, which is generated by a target coordinate generator, and compare these signals by electronic means.

A principal object of the present invention is to provide a novel comparator and AND circuit.

A further object of the instant invention is to provide a novel phase comparator circuit utilizing a dual triode and diode.

A further object of the instant invention is to provide a structure for producing an A.C. output voltage proportional to the difference in phase between two A.C. input voltages.

Other objects and many of the attendant advantages of this invention will be readily appreciated as the same becomes better understood by reference to the following detailed description when considered in connection with the accompanying drawings wherein:

FIG. 1 is a simplified schematic diagram of the phase comparator and "AND" gate; and FIG. 2 is a block diagram of the coordinate gate generator showing utilization of the phase comparator "AND" gate in the simulator circuitry.

Referring now to FIGURE 1, the phase comparator circuit comprises two triodes halves 10 and 12. An azimuth signal from a target coordinate generator is applied to the cathode of the first half of the phase comparator 10 and the plate of the second half of the phase comparator 12 at point 14. A 26 volt 400 cycle per second reference voltage is applied to each of the grids of the tubes 10 and 12 at point 16. If the reference voltage applied to the grids of the tubes 10 and 12 is negative both tubes are cut off. If however, the grids are at a positive voltage one of tubes 10 or 12 conducts depending upon the polarity of the azimuth error voltage at point 14. Conduction in either tube 10 or 12 clamps point 14 approximately to ground potential. During the negative cycles of the reference voltage applied to the grids of tubes 10 and 12 both tubes are cutoff and the voltage at point 14 is positive or negative depending upon the azimuth error voltage applied at point 14 through resistor 18. The cathode of crystal rectifier 20 is connected to point 14. Therefore, positive voltages at point 14 will not pass through rectifier 20. Capacitor 22 is connected across the anode connection of rectifier 20 and ground. When negative signals are passed by rectifier 20 capacitor 22 charges. However capacitor 22 will only charge when both point 14 is negative and the tubes 10 and 12 are cutoff by the action of a negative signal applied to the grids of these tubes from the reference signal voltage at point 16. Therefore, a negative output on the phase comparator occurs only when the azimuth error and the reference voltage are in phase. The resultant negative signal is directly coupled to the grid of the AND stage 24 which is connected to capacitor 22. A negative signal applied to grid of AND stage 24 causes this tube to cutoff with a resultant rise in plate potential at point 26 providing a positive output signal which occurs when there is coincidence in phase condition of azimuth error voltage and the reference signal voltage. Resistor 28 provides the load for rectifier 20 and the grid resistor for AND gate 24. Resistor 30 is the plate load for AND gate 24. Resistor 18 is the input current limiting resistor for azimuth error input signals. Resistors 32 and 34 are the respective grid input resistors for tubes 10 and 12. Plus 150 volts is provided at point 36 for the plate current for AND gate 24.

Thus it is seen that by means of the circuitry of the instant invention a phase comparison is made between two alternating current voltages without any respect to their frequency and an output is provided whenever the two voltages are in phase.

Obviously many modifications and variations of the present invention are possible in the light of the above teachings. It is therefore to be understood that within the scope of the appended claims the invention may be practiced otherwise than as specifically described.

What is claimed is:

1. A phase comparator circuit comprising; comparison means to compare two alternating current signals; means operatively connected to said comparison means to provide an output signal which is coincident with the coincidence of the two alternating current signals; said comparison means including means to provide an output signal whenever two input signals are not coincident in phase, and further including dual triodes connected anode to cathode with reference signal means applied to their grids and error signal means applied to one interconnected plate and cathode; rectifier means, said rectifier means connected to said phase comparison means, for providing a signal which produces an output when two alternating current input signals are coincident in phase and for providing an output signal when two alternating current input signals connected to said phase comparison means are not coincident in phase; and capacitor storage means, said capacitor storage means being connected to the output of said rectifier means, for storing and discharging electric charges in conformance with the phase coincidence of the two alternating current input signals to said phase comparison means; and signal generating means, said signal generating means being operatively connected to said capacitor storage means, and controlled by the signals generated thereby.

2. The combination of claim 1 wherein said signal generating means comprises a triode operated Class B.

References Cited by the Examiner
UNITED STATES PATENTS
2,876,382  3/59  Sziklai _____ 328—133
2,878,448  3/59  Maxey _____ 328—134

OTHER REFERENCES
Radiotron Designer's Handbook by Langford-Smith, 4th ed., page 800, Fig. 18.24 (1952), Wireless Press.
Pulse and Digital Circuits, by Millman and Taub, McGraw-Hill Book Co., Inc. (1956), page 128, Fig. 4–28.

ARTHUR GAUSS, Primary Examiner.